United States Patent [19]

Ueno et al.

[11] Patent Number: 4,992,295
[45] Date of Patent: Feb. 12, 1991

[54] METHOD OF PRODUCING FROZEN SURIMI AND PRODUCT THEREOF

[75] Inventors: Ryuzo Ueno, Nishinomiya; Toshitaka Nakashima; Kunihiko Tomiyasu, both of Ushiku; Yatsuka Fujita, Nishinomiya, all of Japan

[73] Assignee: Kabushiki Kaisha Ueno Seiyaku Oyo Kenkyujo, Osaka, Japan

[21] Appl. No.: 324,113

[22] Filed: Mar. 16, 1989

[30] Foreign Application Priority Data

Mar. 16, 1988 [JP] Japan .................................. 63-62894

[51] Int. Cl.$^5$ ............................................. A23L 1/325
[52] U.S. Cl. .................................................... 426/643
[58] Field of Search ................................ 426/643, 652

[56] References Cited

U.S. PATENT DOCUMENTS

| 3,959,517 | 5/1976 | Niki et al. | 426/643 |
| 4,342,790 | 8/1982 | Katoh et al. | 426/643 X |
| 4,579,741 | 4/1986 | Hanson et al. | 426/643 X |
| 4,806,378 | 2/1989 | Ueno et al. | 426/643 |

FOREIGN PATENT DOCUMENTS

| 52-38105 | 9/1977 | Japan | 426/643 |
| 57-155971 | 9/1982 | Japan | 426/643 |

*Primary Examiner*—Arthur L. Corbin
*Attorney, Agent, or Firm*—Sughrue, Mion, Zinn, Macpeak & Seas

[57] ABSTRACT

The present invention provides a method of frozen surimi, surimi based products and additives for dehydrated minced fish meat, in which reduced hydrolyzed starch is mixed with fish meat and the mixture frozen, and whereby said starch prevents the frozen surimi from freezing denaturation.

5 Claims, No Drawings

METHOD OF PRODUCING FROZEN SURIMI AND PRODUCT THEREOF

BACKGROUND OF THE INVENTION

The present invention relates to a method of producing frozen minced fish meat (referred to as "frozen surimi").

Conventionally, frozen surimi has been produced by the process in which minced fish meat obtained from a fish meat, such as pollack, is subjected to two or more washes with fresh water, with the addition of a small amount of common salt to the fresh water used at the last wash step, removal of skin by a refiner where necessary, dehydrating by a screw-press, and then mixing with the addition of sugars or sugar alcohols, polyphosphates etc. Finally the product is packed and stored under refrigeration at minus 20° C. - minus 30° C. until delivery.

So far, in order to prevent the deterioration of frozen surimi, especially denaturation during freezing, sugars or sugar alcohols such as sugar or sorbitol have been generally added to dehydrated minced fish meat. These sugars or sugar alcohols advantageously give fairly reworkable effects for controlling the freezing denaturation, though according to the amount used. These sugars or sugar alcohols, however, have a fairly strong sweet taste, so as the amount added increases, the sweetness of the surimi based product proportionally increases to give an unfavorable product. Accordingly, sugars or sugar alcohols should be added in moderation to the dehydrated minced fish meat. On the contrary, starch, which has favorably no taste, exhibits little effect in the prevention of freezing denaturation, and cannot be used as a substitute for the sugars or sugar alcohols.

There are disclosed in Japanese Patent Publication No.3016/1981, Japanese Patent Application KOKAI No. 155971/1982 and Japanese Patent Application KOKAI No. 249365/1986 that hydrolyzed products of starch have effects in the prevention of freezing denaturation without sweetness, but baked or fried fish products such as tempra, satsuma-age, fried-ball; yaki-kamaboko, e.g. chikuwa, sasa-kamaboko, yakinuki-kamaboko, and as such, produced from the surimi containing such hydrolyzed starch have a defect to change in color to brown. This defect would be fatal in white surimi based products such as shiroten, shiro-chikuwa and the like, the commercial value of which exists in their whiteness.

SUMMARY OF THE INVENTION

The object of the present invention is to provide a method of producing frozen surimi free from the aforementioned problems, in which reduced hydrolyzed starch is added to dehydrated minced fish meat. The frozen surimi obtained according to the method of the present invention is controlled in the freezing denaturation without change of taste, especially increase of sweetness, and surimi based products obtained from the frozen surimi do not change in color, are excellent in whiteness and elasticity (ashi). The whiteness and gloss of surimi or surimi based products can be further improved by the addition of surface active agents for foods, fats and/or oils.

DETAILED DESCRIPTION OF THE INVENTION

The present invention relates to a method of producing frozen surimi which comprises mixing 0.5 to 15 parts by weight of reduced hydrolyzed starch with 100 parts by weight dehydrated minced fish meat, and freezing the resultant mixture.

The method of the present invention may be applied to most kinds of fish which can be used for production of surimi and surimi based products, such as walleye pollack, atka mackerel, sardine, mackerels, pacific herring, saury, hairtail, pike eel, croaker, right-eye flounders, horse mackerel, Pacific hake, hoki, threadfin breams, alfonsino and the like.

Dehydrated minced fish meat is usually obtained from fish meat through the following processes: (1) removing skin, tendon, blood-colored meat and the like from the fish meat, (2) washing the resultant fish meat with water, (3) passing the washed fish meat through a refiner, (4) washing the fish meat from the refiner (minced fish meat) with water or salt containing water, and then (5) dehydrating the washed minced fish meat. The term "dehydrated minced fish meat" of the present invention is used to mean the aforementioned.

The reduced hydrolyzed starch of the present invention is a reduced hydrolyzed material comprising oligo sugar alcohols which contain trisaccharides or higher saccharides at least 40 % by weight or more, preferably 60 % by weight or more.

The reduced hydrolyzed starch can be prepared by hydrolyzing starch to a reducible monosaccharide such as glucose; and reducible oligosacharides, for instance, a reducible disaccharide such as maltitose, isomaltitose, gentibiose; a reducible trisaccharide such as maltotriose, isomaltotriose, panose; a tetrasaccharide such as maltotetraose; pentasaccharides such as maltopentaose; hexasaccharides such as maltohexaose; and higher saccharides containing more than six monosaccharose units such as dextrin; and then hydrogenating the reducible hydrolyzed intermediates from starch. The product is constituted with saccharide units retaining at least one hemiacetal hydroxyl group of the terminal glucose residue of the saccharides. The method of reducing the hydrolyzed intermediates is disclosed in Japanese Patent Publication No.18898/1969. Japanese Patent Publication No. 18898/1969 states at page 2, column 3, at lines 5–15 thereof, the following:

"The present invention is characterized in the conversion of hydrolyzed intermediate of a reducible starch to a hydrolyzed intermediate of a non-reducible starch, in which a buffer such as secondary sodium phosphate is added to an aqueous solution of hydrolyzed intermediate of a reducible starch, so as to control the pH value of the solution between about 7 -9 , and the reducible starch is hydrogenated with hydrogen under a pressure of about 50 -130 kg/cm$^2$ at about 50°-150° C. under the presence of a reducing agent such as a nickel catalyst as maintaining the pH value between about 7 -9 as adding the buffer, e.g. secondary sodium salt under the pressure, so that any degradation reaction and isomerization occur as little as possible."

Reduced hydrolyzed starch containing sorbitol and maltitol in large amount cannot be used as main additives in the present invention, because these give sweetness to obtained surimi based products. On the contrary the reduced hydrolyzed starch containing oligo sugar alcohols of about more than 40 % by weight, especially more than 60 % by weight are not so sweet and can be added to the dehydrated minced fish meat in large amount without increase of sweetness. Therefore, sufficient effect of preventing freezing denaturation can be achieved by the addition of the reduced hydrolyzed starch.

In the present invention especially preferable reduced hydrolyzed starch is trisaccharides-heptasaccharides having no or substantially no branches.

The reduced hydrolyzed starch in the present invention may be used at 0.5 to 15 parts by weight, and more preferably 1.0 to 5.0 parts by weight to 100 part by weight of the dehydrated minced fish meat. When less than 0.5 part by weight is used sufficient prevention effect from freezing denaturation cannot be achieved, whereas when more than 15 parts by weight is used the taste of the surimi based product will still be influenced, through dependent on the content of sugar or sugar alcohols in the surimi based products.

The main object of the addition of the reduced hydrolyzed starch is to prevent frozen surimi from the freezing denaturation. The effects obtained from the reduced hydrolyzed starch is superior to those obtained from the sorbitol and the like conventionally used for the same object. Additionally, the reduced hydrolyzed starch used in the present invention gives no substantial influence to sweetness of the surimi based products, and can be used in large amount, so more excellent effects can be achieved without any discoloration or other defect inherent to hydrolyzed starch that is not reduced.

In order to improve the nature of frozen surimi; conventional additives for frozen surimi such as surface active agents for foods, fats and oils, branched dextrin, polyphosphates and the like may be added together with the reduced hydrolyzed starch in the present invention.

The surface active agents are important to maintain ashi of frozen surimi, and to give a surimi based product excellent in the whiteness. When the surface active agents for food is used together with the reduced hydrolyzed starch of the present invention, frozen surimi and surimi based product more excellent in the whiteness and the gloss can be obtained.

The amount of the surface active agent may be about 0.05 -1.0 parts by weight, more preferably 0.1-0.5 parts by weight based on 100 parts by weight of the dehydrated minced fish meat.

The surface active agents which may be used in the present invention include fatty acid esters of glycerin, fatty acid esters of sugar, fatty acid esters of sorbitan, fatty acid esters of propyleneglycol, fatty acid esters of polyglycerin, lecithin, fatty acid esters of polyoxyethylene sorbitan, mixtures thereof and the like.

The surface active agents may be used alone or co-used with fats and/or oils. These may be preferably used in a form of dispersion in reduced hydrolyzed starch regardless of the single use of the surface activeagents or co-use with fats and/or oils.

As fats and oils there are exemplified triglycerides of fatty acids, and esters of higher fatty acids with higher fatty alcohols, for instance, vegetable oils such as rapeseed oil, soybeen oil, cottonseed oil, rice bran oil, corn oil, olive oil, peanut oil, palm oil, and the like; animal oils such as tallow oil, lard, fish oils and the like.

The fats and/or oils can give effects similar to the surface active agents. Preferable amount of the fats and oils is about 0.05 to 1.0 parts by weight, more preferably from 0.1 to 0.5 parts by weight based on 100 parts by weight of the dehydrated minced fish meat.

. In order to provide the reduced hydrolyzed starch as additives for surimi, single pack containing the reduced hydrolyzed starch alone may be provided or admixture of the reduced hydrolyzed starch with other additives such as surface active agents for food which may contain fats and/or oils as one pack additives, or two or three pack, additives in which the reduced hydrolyzed starch and other additives may be separately packed, may be provided.

If the surface active agents are solid and hardly soluble materials in cold water, such as monoglycerides, they are difficult to homogeneously mix with dehydrated minced fish meat if directly added into the dehydrated minced fish meat. In such a case, granules of mixture of the surface active agents with the reduced hydrolyzed starch which may be prepared by homogeneously melting the former into the latter may be added into the dehydrated minced fish meat. The surface active agents can be easily dispersed into the fish meat within short period using such a mixture, so that the whiteness and ashi of the surimi based product can be improved by a small amount of the surface active agents.

The additives for dehydrated minced fish meat used in the method of the present invention may be added before freezing. Adding process, order, timing, mixing method and the like are not restricted, and the additives used in the method of the present invention can be applied to any kinds of surimi such as surimi containing no or little salt (muensurimi), surimi containing salt at a substantial amount (kaen surimi), surimi containing no or little phosphates (murin-surimi) and the like.

The additives used in the present invention may contain other freezing denaturation preventing agents such as polyphosphates, elasticity increasing agents such as ovoprotein, lactoprotein, blood plasma etc. and the like.

The present invention is illustrated by the following examples.

EXAMPLE 1

Dehydrated minced fish meat is prepared according to the ordinary process from Walleye pollack caught on the preceding day, and is mixed so as to make the water content uniform throughout, and then , into every 10 kg of the meat each as a test lot, are incorporated polyphosphate 0.3 % by weight and additives as shown in Table 1. Each lot of the resultant mixture is made to form a uniform system by mixing for 7 minutes with a small silent cutter to give surimi. The obtained surimi is packed, 3.5 kg each in a polyethylene bag, and each bag of the surimi is frozen to a temperature of minus 30° C. by overnight refrigeration by means of an airblast refrigerator and subsequently stored under refrigeration at minus 30° C.

Just after the refrigeration, after three months and six months of cold storage under the above stated condition, each test lot of the frozen surimi, packed for 3.5 kg each, is left standing overnight in a room to thaw naturally.

A 3 kg portion from each pack is put in a small silent cutter, common salt and potato starch are added thereto in quantities of 3 % by weight and 5 % by weight, respectively, and the mixture is kneaded in a small silent cutter for 13 minutes, stuffed in a polyvinylidene chloride film with a layflat width of 48 mm, and then heated in hot water at 90° C. for 30 minutes to give casing kamaboko, (1).

On the other hand, the kneaded fish meat prepared according to the same manner as just above mentioned is shaped in a small laboratory dish (Schale) (diameter: 40 mm, and depth: 10 mm) instead of being stuffed in the film and heated in hot water. The both sides of schale shaped fish meat are fried in salad oil at 160° C for 1.5 minute respectively, and then cooled at room temperature to give flied kamabokos (age-kamaboko) (2).

Water content, pH value, Hunter's whiteness, and jelly strength are determined for the surimi and the casing kamaboko, and discoloration into brown (depth of brown) is evaluated for each fried kamaboko.

Hunter's whiteness is determined by ND-101D type Digital Differential Colorimeter (available from Nippon Denshoku Kogyo K.K.);

The elasticity of the kamaboko is determined using a bulb plunger (diameter: 5mm) in a food rheometer (available from Fudo Kogyo K.K.), and expressed by Jelly strength (W×L (g×cm)); and The discoloration is evaluated according to a sensory test by 10 member panel, and the results are expressed by average. The standard of the evaluation is as follows:

0 : substantially no change in color is observed,
1 : a little change into brown is observed,
2 : change into brown is apparently observed, and
3 : remarkable change is observed.

TABLE 1

(evaluation of quality of surimi and kamaboko just after freezing)

| test lot | | | | surimi | | | casing kamaboko | | | | fried kamaboko discoloration |
|---|---|---|---|---|---|---|---|---|---|---|---|
| No | group | additives | adding amount (wt %) | pH value | water content (%) | Hunter's whiteness | pH value | water content (%) | Hunter's whiteness | Jelly strength (g × cm) | |
| 1 | a | A | 5 | 7.56 | 79.4 | 18.1 | 7.25 | 73.5 | 40.5 | 487 | +0.5 |
| 2 | a | B | 5 | 7.55 | 79.4 | 18.0 | 7.22 | 73.5 | 40.5 | 475 | 0 |
| 3 | a | C* | 5 | 7.58 | 79.4 | 19.2 | 7.22 | 73.5 | 41.5 | 460 | +2.2 |
| 4 | b | D** | 5 | 7.56 | 79.3 | 19.3 | 7.23 | 73.4 | 41.6 | 490 | 0 |
| 5 | b | D E | 5 0.3 | 7.54 | 79.3 | 23.5 | 7.20 | 73.4 | 43.0 | 488 | 0 | group
a: comparative
b: present invention
additives
A: sugar
B: sorbitol
C: hydrolyzed starch
D: reduced hydrolyzed starch
E: fatty acid ester of glycerin
*Pinedex #2 DE = 10-12 (available from Matsutani Kagaku Kogyo Co, LTD)
**SE-P: sorbitol 10-15% maltitol 10-15% maltitriol 10-15% oligo sugar alcohol 65-85% (Nikken Chemicals Co, LTD)

TABLE 2

(evaluation of quality of surimi and kamaboko after 3 months of cold storage)

| test lot | | | | surimi | | | casing kamaboko | | | | fried kamaboko discoloration |
|---|---|---|---|---|---|---|---|---|---|---|---|
| No | group | additives | adding amount (wt %) | pH value | water content (%) | Hunter's whiteness | pH value | water content (%) | Hunter's whiteness | Jelly strength (g × cm) | |
| 1 | a | A | 5 | 7.51 | 79.4 | 18.0 | 7.24 | 73.5 | 40.1 | 455 | +0.4 |
| 2 | a | B | 5 | 7.52 | 79.3 | 18.0 | 7.23 | 73.4 | 40.0 | 450 | 0 |
| 3 | a | C | 5 | 7.50 | 79.4 | 19.1 | 7.22 | 73.5 | 41.3 | 428 | +2.3 |
| 4 | b | D | 5 | 7.50 | 79.3 | 19.1 | 7.22 | 73.4 | 41.4 | 460 | 0 |
| 5 | b | D E | 5 0.3 | 7.47 | 79.3 | 23.4 | 7.21 | 73.4 | 42.7 | 456 | 0 | group
a: comparative
b: present invention
additives
A: sugar
B: sorbitol
C: hydrolyzed starch
D: reduced hydrolyzed starch
E: fatty acid ester of glycerin

TABLE 3

(evaluation of quality of surimi and kamaboko after 6 months of cold storage)

| test lot | | | | surimi | | | casing kamaboko | | | | fried kamaboko discoloration |
|---|---|---|---|---|---|---|---|---|---|---|---|
| No | group | additives | adding amount (wt %) | pH value | water content (%) | Hunter's whiteness | pH value | water content (%) | Hunter's whiteness | Jelly strength (g × cm) | |
| 1 | a | A | 5 | 7.44 | 79.4 | 17.9 | 7.31 | 73.5 | 39.9 | 410 | +0.5 |
| 2 | a | B | 5 | 7.45 | 79.3 | 17.7 | 7.28 | 73.4 | 39.7 | 415 | 0 |
| 3 | a | C | 5 | 7.45 | 79.4 | 19.0 | 7.21 | 73.5 | 41.1 | 399 | +2.5 |
| 4 | b | D | 5 | 7.47 | 79.3 | 19.0 | 7.23 | 73.4 | 41.1 | 420 | 0 |
| 5 | b | D | 5 | 7.43 | 79.3 | 23.4 | 7.20 | 73.4 | 42.6 | 415 | 0 |

TABLE 3-continued (evaluation of quality of surimi and kamaboko after 6 months of cold storage)

| test lot | | | surimi | | | casing kamaboko | | | fried |
|---|---|---|---|---|---|---|---|---|---|
| No | group | additives | adding amount (wt %) | pH value | water content (%) | Hunter's whiteness | pH value | water content (%) | Hunter's whiteness | Jelly strength (g × cm) | kamaboko discoloration |
| | | E | 0.3 | | | | | | | | group
a: comparative
b: present invention
additives
A: sugar
B: sorbitol
C: hydrolyzed starch
D: reduced hydrolyzed starch
E: fatty acid ester of glycerin The results shown in Tables 1 and 2 illustrate that the frozen surimi and surimi based products produced according to the present invention are prevented from freezing denaturation and are excellent in whiteness, and discoloration to brown in fried kamaboko is not observed.

What is claimed is:

1. A method of producing frozen surimi which comprises mixing 0.5 to 15 parts by weight of reduced hydrolyzed starch with 100 parts by weight of dehydrated minced fish meat, and then freezing the obtained mixture.

2. The method of claim 1 in which surface active agents for food, fats and/or oils are additionally mixed into the dehydrated minced fish meat together with the reduced hydrolyzed starch.

3. The method of claim 1, in which the reduced hydrolyzed starch contains 40 % by weight of oligo sugar alcohol of at least three monosaccharose units.

4. A frozen surimi produced by the process of claim 1.

5. A frozen surimi which comprises 0.5 to 15 parts by weight of reduced hydrolyzed starch in 100 parts by weight of dehydrated minced fish meat.

* * * * *